March 12, 1963    L. E. HECKATHORN    3,080,931
AUTOMATICALLY FOLDING DISC
Filed Dec. 5, 1960    3 Sheets-Sheet 1
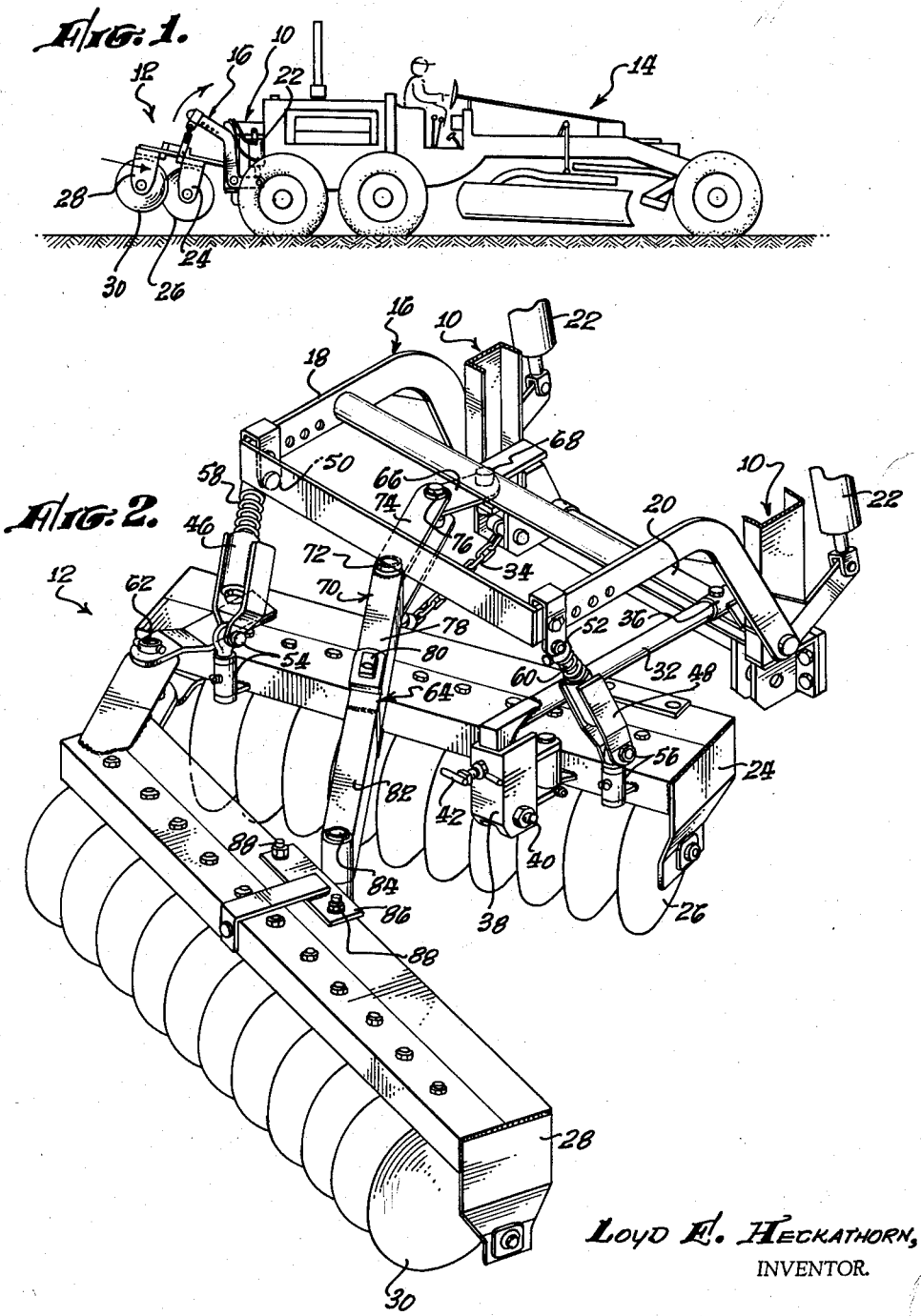
Loyd E. Heckathorn,
INVENTOR.
BY His Attorneys.
Harris, Kiech, Russell & Kern

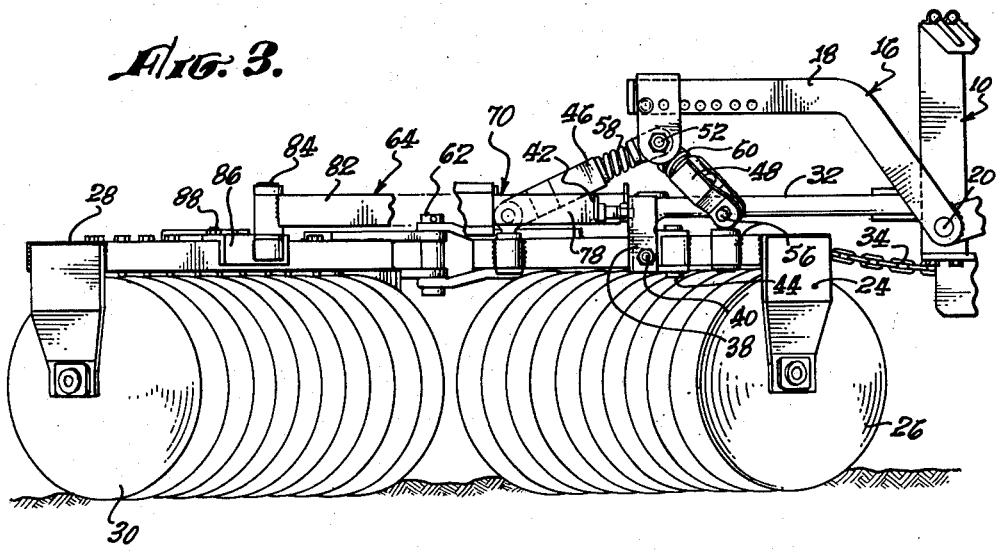
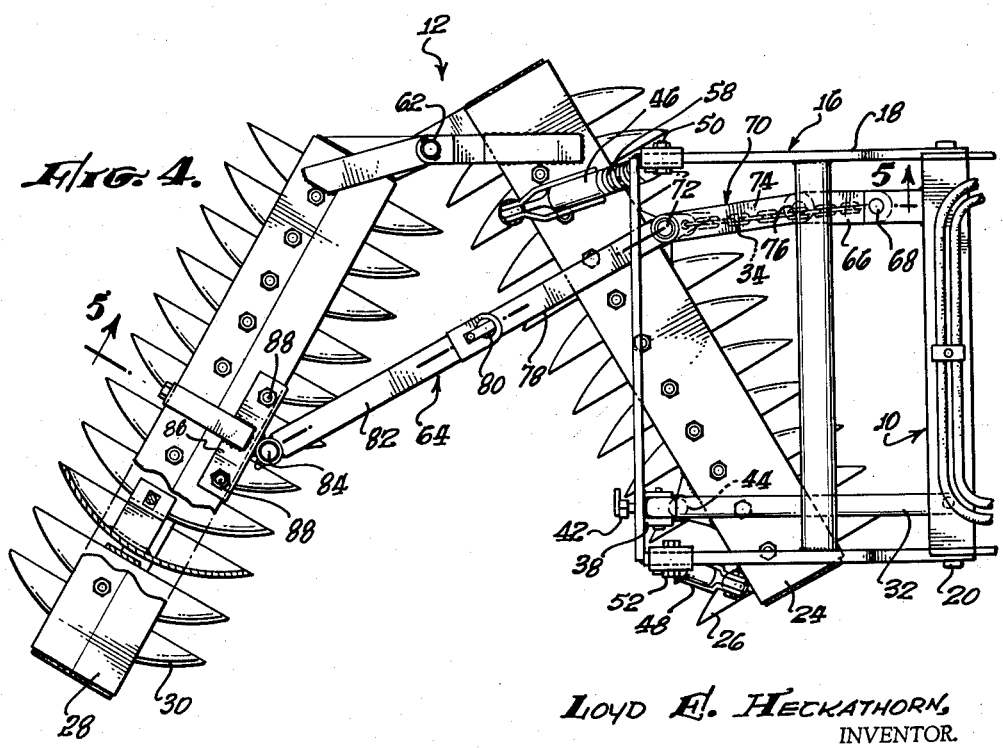

March 12, 1963  L. E. HECKATHORN  3,080,931
AUTOMATICALLY FOLDING DISC
Filed Dec. 5, 1960  3 Sheets-Sheet 3
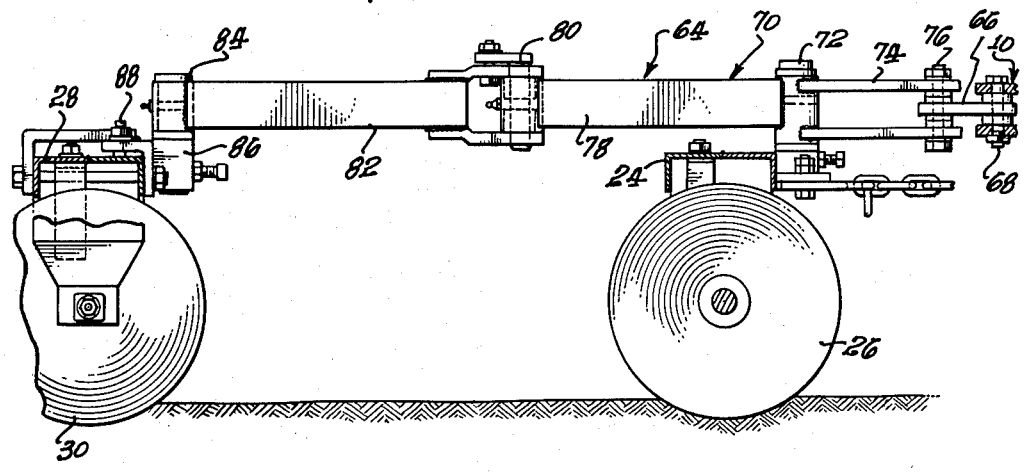
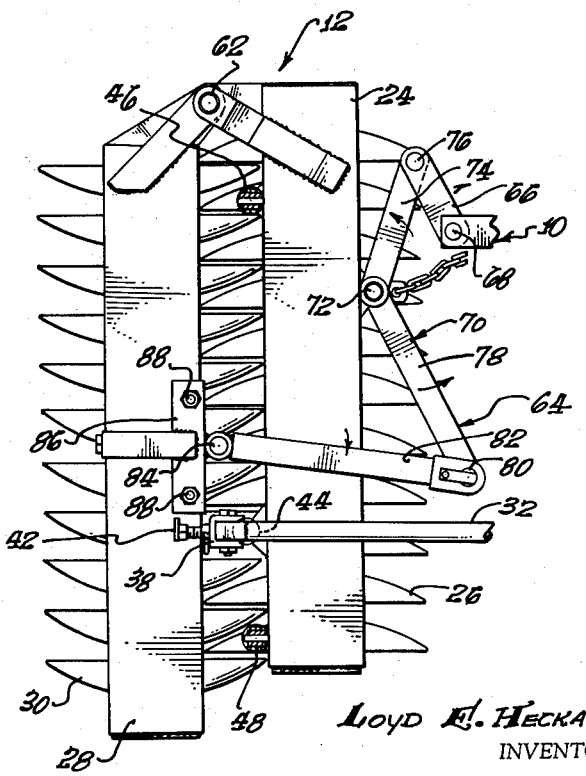
LOYD E. HECKATHORN,
INVENTOR.
BY His Attorneys.
HARRIS, KIECH, RUSSELL & KERN.

3,080,931
AUTOMATICALLY FOLDING DISC
Loyd E. Heckathorn, Garden Grove, Calif., assignor to Towner Manufacturing Company, Santa Ana, Calif., a corporation of California
Filed Dec. 5, 1960, Ser. No. 73,687
6 Claims. (Cl. 172—455)

The present invention relates in general to a disc, or similar implement, and, more particularly to a disc which is so mounted on a tractive vehicle that it may be lifted clear of the ground, a primary object of the invention being to provide a two-gang disc which automatically folds into a compact unit, with the two disc gangs perpendicular to the direction of movement of the vehicle, in response to lifting of the disc clear of the ground.

More particularly, an important object of the invention is to provide, in combination: tractive supporting means, such as a frame of or on a tractive vehicle; front and rear disc gangs respectively pivotable relative to the tractive supporting means about front and rear upright axes between divergent operative positions wherein the disc gangs are inclined relative to the direction of movement of the tractive supporting means and parallel inoperative positions wherein the disc gangs are perpendicular to the direction of movement; and means interconnecting the disc gangs and the tractive supporting means for lifting the disc gangs and for simultaneously pivoting the disc gangs about their upright axes from their operative positions to their inoperative positions.

Another object of the invention is to provide lifting means on the tractive means and suspension means interconnecting the front disc gang and the lifting means and suspending the front disc gang from the lifting means for pivoting the front disc gang about its upright axis from its operative position to its inoperative position automatically in response to lifting of the front disc gang. A related object is to provide a suspension means comprising two suspension links pivotally connected to the lifting means and the front disc gang on opposite sides of the upright pivot axis of the front disc gang.

Still another object is to provide linkage means interconnecting the tractive supporting means, the front disc gang and the rear disc gang, and responsive to lifting of the front disc gang and to pivoting of the front disc gang from its operative position to its inoperative position, for lifting the rear disc gang and for simultaneously pivoting the rear disc gang about its upright pivot axis from its operative position to its inoperative position.

A further object is to provide a draft means interconnecting the front disc gang and the tractive supporting means and including two laterally spaced draft members one of which is a draft bar, the front disc gang being pivotable relative to the draft bar about its aforementioned upright pivot axis. The other of the two draft members mentioned limits the extent to which the front disc gang can pivot about the upright pivot axis provided by the pivotal interconnection between the draft bar and the front disc gang.

Yet another object is to provide a pivotal interconnection between the front and rear disc gangs which provides the aforementioned upright pivot axis for the rear disc gang.

Another important object of the invention is to provide a folding disc wherein the individual blades on the front and rear disc gangs are interleaved when the disc gangs are in their folded or inoperative positions, thereby providing a very compact folded unit.

The foregoing objects, advantages, features and results of the present invention, together with various other objects, advantages, features and results thereof which will be evident to those skilled in the drawn implement field in the light of this disclosure, may be achieved with the exemplary embodiment of the invention described in detail hereinafter and illustrated in the accompanying drawings, in which:

FIG. 1 is a side elevational view illustrating an automatically folding disc of the invention mounted on a motor grader;

FIG. 2 is a perspective view, with some parts broken away, of the automatically folding disc of the invention, the gangs of the disc being in their operative or unfolded positions;

FIG. 3 is a side elevational view of the automatically folding disc with the gangs in their operative positions;

FIG. 4 is a plan view of the disc with the gangs in their operative positions;

FIG. 5 is a sectional view taken along the arrowed line 5—5 of FIG. 4; and

FIG. 6 is a plan view of the disc, with some parts omitted, showing the gangs in their folded or inoperative positions.

In the drawings, the numeral 10 designates a frame which constitutes a tractive supporting means for a disc 12, or other implement, and which is mounted on any suitable tractive vehicle, such as the motor grader 14 shown in FIG. 1. The frame 10 may have any suitable configuration, depending on the structure of the particular tractive vehicle on which it is to be mounted. Alternatively, the frame 10 may in some instances be partially or entirely a portion of a tractive vehicle frame.

Mounted on the frame 10 for upward and downward pivotal movement relative thereto about a horizontal axis transverse to the direction of movement to the tractive vehicle 14 is a lifting means 16. In the particular construction illustrated, the lifting means 16 comprises a generally U-shaped lifting frame 18 the arms of which embrace the supporting frame 10 and are pivotally connected thereto by means of a transverse horizontal pivot shaft 20. The arms of the lifting frame 18 extend forwardly, in the direction of movement of the tractive vehicle 14, beyond the pivot shaft 20 and are connected to the supporting frame 10 by hydraulic cylinders 22, one of which is completely visible in FIG. 1 of the drawings. As will be apparent, by extending and contracting the hydraulic cylinders 22, the lifting frame 18 is caused to pivot upwardly and downwardly, respectively, about the axis of the pivot shaft 20.

The disc 12 includes a front disc gang 24 having blades 26 and a rear disc gang 28 having blades 30. The front gang 24 is connected to the supporting frame 10 by a draft means which includes laterally spaced draft members 32 and 34, the former being a draft bar and the latter a draft chain.

The draft bar 32 is connected at its forward end to a socket 36 on the pivot shaft 20. At its rearward end, the draft bar 32 is bent downwardly and is pivotally connected to a coupling 38 by a transverse horizontal pivot pin 40. A forwardly-facing adjusting screw 42 carried by the coupling 38 engages the downturned rear end of the draft bar 32 so as to relatively pivot the coupling and the draft bar about the axis of the pivot pin 40 for the purpose of leveling the disc 12 in the fore-and-aft direction. The coupling 38, in turn, is pivotally connected to the front gang 24 by an upright first or front pivot which permits the front gang 24 to pivot relative to the supporting frame 10, or, more specifically, the draft bar 32, about a first or front upright pivot axis.

The draft bar 32 is located adjacent one end of the front gang 24 and the draft chain 34 interconnects the supporting frame 10 and the front gang adjacent the other end of the front gang. The draft chain limits rearward pivoting of the corresponding end of the front gang 24 about the upright axis of the front pivot 44. In other words, the draft chain 34 determines the angle through which the front gang 24 may pivot from an inoperative position perpendicular to the line of draft to an operative position inclined relative to the line of draft.

The front disc gang 24 is connected to the lifting frame 18 on opposite sides of the front pivot 44 by a suspension means comprising two suspension link 46 and 48. Transverse horizontal pivot pins 50 and 52 pivotally connect the upper ends of the suspension links 46 and 48 to opposite sides of the lifting frame 18, while swivel fittings 54 and 56 pivotally and swivelably connect the lower ends of the suspension links to the front disc gang 24.

The points of pivotal connection of the suspension links 46 and 48 to the lifting frame 18 are laterally opposite each other, relative to the line of draft. The points of pivotal and swivelable connection of the suspension links 46 and 48 to the front disc gang 24 are also laterally opposite each other, but relative to the front disc gang itself. Consequently, when the front gang 24 is in its operative position, as shown in FIGS. 2 to 4 of the drawings, the suspension link 46 slopes downwardly and rearwardly while the suspension link 48 slopes downwardly and forwardly. On the other hand, when the front gang 24 is in its inoperative position, wherein it is perpendicular to the line of draft, the suspension links 46 and 48 are vertical.

In view of the foregoing relationship, when the lifting frame 18 is pivoted upwardly sufficiently to lift the front disc gang 24 clear of the ground, the action of gravity automatically causes the front gang to pivot, about the upright axis provided by the front pivot 44, into its inoperative position, wherein it is perpendicular to the line of draft, as shown in FIG. 6 of the drawings. This pivotal movement of the front disc gang 24 into its inoperative position upon lifting thereof is inherent in the structure described and occurs automatically, which is an important feature.

In the particular construction illustrated, the suspension links 46 and 48 are telescoping links which are biased into their extended positions by springs 58 and 60, respectively, and which are also biased into their extended positions by the weight of the front disc gang 24 when it is suspended from these links. With this construction, the cylinders 22 may be utilized to apply a downward force to the front disc gang through the lifting frame 18 and the suspension links 46 and 48 when the disc 12 is in operation. For example, this might be done when discing hard ground. The springs 58 and 60 incorporated in the suspension links 46 and 48 permit these links to yield, i.e., to contract, to compensate for irregularities in the surface being disced.

The rear disc gang 28 is pivotable relative to the supporting frame 10, or, more specifically, relative to the front disc gang 24, about a second or rear upright pivot axis provided by a second or rear pivot 62. This pivot interconnects the end of the front disc gang 24 which is rearmost when the front disc gang is in its operating position and the end of the rear disc gang which is forwardmost when the rear disc gang is in its operating position.

The supporting frame 10, the front disc gang 24 and the rear disc gang 28 are interconnected by a linkage means 64, responsive to lifting of the front disc gang and to pivoting of the front disc gang from its operative position to its inoperative position, for lifting the rear disc gang and for simultaneously pivoting the rear disc gang about the upright axis of the second pivot 62 from its operative position to its inoperative position, the latter being shown in FIG. 6 of the drawings. As also shown in FIG. 6, when both of the disc gangs 24 and 28 are in their inoperative positions, the respective blades 26 and 30 thereof are interleaved so that the disc 12 forms a very compact folded unit, which is an important feature.

Considering the linkage means 64 in more detail, it includes at its forward end a link 66 pivotally connected to the supporting frame 10 by a vertical pivot pin 68. The linkage means 64 also includes a crank 70 mounted on the front disc gang 24 by means of a vertical pivot 72. The crank 70 includes an arm 74 which is pivotally connected to the link 66 by a vertical pin 76. The crank 70 also includes an arm 78 which is rigidly connected to the arm 74 and which is pivotally connected, by means of a pivot pin 80, to one end of a link 82. The opposite end of the link 82 is pivotally connected, by means of a vertical pivot 84, to the rear disc gang 28.

As best shown in FIG. 5 of the drawings, the pivots 72 and 84 respectively cooperate with the crank 70 and the link 82 in such a manner as to substantially prevent relative vertical movement therebetween, and the crank arm 78 and the link 82 are also interfitted in such a manner as to substantially prevent relative vertical movement therebetween. Thus, the crank 70 and the link 82 are substantially rigid in the vertical direction so that lifting of the front disc gang 24 by the lifting means 16 also results in lifting of the rear disc gang 28, this being the case irrespective of whether the joint formed by the crank arm 78 and the link 82 is straight, as shown in FIG. 4, or is broken, as shown in FIG. 6. In order to permit lateral leveling of the rear disc gang 28, the pivot 84 is mounted on a coupling 86 which is connected to the rear disc gang 28 by bolts 88 on opposite sides of the pivot 84 and may be adjusted laterally relative to the rear disc gang by said bolts. This adjustment compensates for wear at the pivots 72 and 84 and at the pivot pin 80.

As will be apparent from FIGS. 2 and 4, when the disc 12 is in operation, the joint formed by the crank arm 78 and the link 82 is straight and in tension to prevent rearward pivoting of the rear disc gang 28 about the upright pivot axis of the rear pivot 62 beyond its operative position. Under such conditions, the draft chain 34 maintains the pivot pin 76 between the link 66 and the crank arm 74 slightly to the left of a line between the pivot pin 68 and the pivot 72. Consequently, when the front disc gang 24 is lifted and simultaneously swung into its inoperative position in the manner hereinbefore described, the pivot pin 76 swings in the clockwise direction, as viewed in FIGS. 4 and 6 of the drawings, from the position shown in FIG. 4 to that shown in FIG. 6. This causes the joint formed by the crank arm 78 and the link 82 to break in such a direction that the pivot pin 80 therebetween moves in the counterclockwise direction, as viewed in FIGS. 4 and 6, from the position shown in FIG. 4 to that shown in FIG. 6. As this occurs, the rear disc gang 28, in addition to being lifted by the crank arm 78 and the link 82, is pivoted forwardly about the upright pivot axis of the second pivot 62 into its inoperative position, shown in FIG. 6, wherein it is perpendicular to the line of draft and parallel to the front disc gang 24. Under such conditions, the respective blades 26 and 30 are interleaved, as hereinbefore explained, to form a very compact folded unit.

Thus, it will be apparent that the present invention provides a disc 12 which automatically folds into the position shown in FIG. 6 of the drawings in response to lifting of the disc clear of the ground. Conversely, when the disc 12 is lowered into engagement with the ground, ground resistance automatically causes the disc to unfold into the position shown in FIG. 4, rearward pivoting of the front gang 24 being limited by the draft chain 34 and rearward pivoting of the rear gang 28 being limited by the joint formed by the crank arm 78 and the link 82.

The disc 12 has particular utility when it is to be used only intermittently, as in connection with the motor grader 14. With such a piece of equipment, the scraper blade and the scarifier of the motor grader 14 may be used independently of or simultaneously with the disc 12, and vice versa. When use of the disc 12 is not desired, it is merely lifted clear of the ground, whereupon it automatically folds into a compact unit with a minimum rear overhang. When it is desired to use the disc 12, as in shaving and cutting up old bituminous roads requiring resurfacing, mixing old or new blacktop, or for other purposes, it is merely necessary to lower the disc into engagement with the surface to be worked, whereupon it automatically unfolds into its operating position. Thus, whether the disc 12 is in its folded or unfolded position is determined solely by whether it is clear of or in engagement with the ground, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow:

I claim:

1. In combination: tractive supporting means; a disc gang pivotable relative to said tractive supporting means about an upright axis between an operative position wherein said disc gang is inclined relative to the direction of movement of said tractive supporting means and an inoperative position wherein said disc gang is perpendicular to said direction of movement; lifting means on said tractive supporting means; and means comprising two suspension links pivotally connected to said lifting means and pivotally connected to said disc gang for pivoting said disc gang about said upright axis from its operative position to its inoperative position in response to lifting of said disc gang.

2. In combination: tractive supporting means; a disc gang; draft means interconnecting said disc gang and said tractive supporting means and including a draft bar, said disc gang being pivotable relative to said draft bar about an upright axis between an operative position wherein said disc gang is inclined relative to the direction of movement of said tractive supporting means and an inoperative positive wherein said disc gang is perpendicular to said direction of movement; lifting means on said tractive supporting means; and means comprising two suspension links pivotally connected to said lifting means and pivotally connected to said disc gang for pivoting said disc gang about said upright axis from its operative position to its inoperative position in response to lifting of said disc gang.

3. In combination: tractive supporting means; a disc gang; draft means interconnecting said disc gang and said tractive supporting means and including a draft bar, said disc gang being pivotable relative to said draft bar about an upright axis between an operative position wherein said disc gang is inclined relative to the direction of movement of said tractive supporting means and an inoperative position wherein said disc gang is perpendicular to said direction of movement; lifting means on said tractive supporting means; and means comprising two suspension links pivotally connected to said lifting means and said disc gang on opposite sides of said upright axis for pivoting said disc gang about said upright axis from its operative position to its inoperative position in response to lifting of said disc gang.

4. In combination: tractive supporting means; a front disc gang; draft means interconnecting said front disc gang and said tractive supporting means and including a draft bar, said front disc gang being pivotable relative to said draft bar about a front upright axis between an operative position wherein said front disc gang is inclined relative to the direction of movement of said tractive supporting means and an inoperative position wherein said front disc gang is perpendicular to said direction of movement; lifting means on said tractive supporting means; suspension means interconnecting said front disc gang and said lifting means and suspending said front disc gang from said lifting means for pivoting said front disc gang about said front upright axis from its operative position to its inoperative position in response to lifting of said front disc gang; a rear disc gang pivotally connected to said front disc gang for pivotal movement relative thereto about a second upright axis between an operative position wherein said rear disc gang is inclined relative to said direction of movement and diverges from said front disc gang and an inoperative position wherein said rear disc gang is perpendicular to said direction of movement and parallel to said front disc gang; and means responsive to lifting of said front disc gang and to pivoting of said front disc gang from its operative position to its inoperative position for lifting said rear disc gang and for simultaneously pivoting said rear disc gang about said second upright axis from its operative position to its inoperative position.

5. In combination of: tractive supporting means; a front disc gang; draft means interconnecting said front disc gang and said tractive supporting means and including a draft bar, said front disc gang being pivotable relative to said draft bar about a front upright axis between an operative position wherein said front disc gang is inclined relative to the direction of movement of said tractive supporting means and an inoperative position wherein said front disc gang is perpendicular to said direction of movement; lifting means on said tractive supporting means; suspension means interconnecting said front disc gang and said lifting means and suspending said front disc gang from said lifting means for pivoting said front disc gang about said front upright axis from its operative position to its inoperative position in response to lifting of said front disc gang; a rear disc gang pivotally connected to said front disc gang for pivotal movement relative thereto about a second upright axis between an operative position wherein said rear disc gang is inclined relative to said direction of movement and diverges from said front disc gang and an inoperative position wherein said rear disc gang is perpendicular to said direction of movement and parallel to said front disc gang; and linkage means interconnecting said tractive supporting means, said front disc gang and said rear disc gang and responsive to lifting of said front disc gang and to pivoting of said front disc gang from its operative position to its inoperative position, for lifting said rear disc gang and for simultaneously pivoting said rear disc gang about said second upright axis from its operative position to its inoperative position.

6. In combination: tractive supporting means; a structure pivotable relative to said tractive supporting means about an upright axis between an operative position wherein said structure is inclined relative to the direction of movement of said tractive supporting means and an inoperative position wherein said structure is perpendicular to said direction of movement; lifting means on said tractive supporting means; and means comprising two suspension links pivotally connected to said lifting means and pivotally connected to said structure for pivoting said structure about said upright axis from its operative position to its inoperative position in response to lifting of said structure.

References Cited in the file of this patent
UNITED STATES PATENTS 2,583,830    Goble _____ Jan. 29, 1952
2,759,312    Rasmussen et al. _____ Aug. 21, 1956